(12) United States Patent
Anderson et al.

(10) Patent No.: US 7,145,586 B2
(45) Date of Patent: Dec. 5, 2006

(54) MARKING OPTICAL DISC BASED ON INFORMATION RELATED TO DATA SIDE THEREOF

(75) Inventors: Daryl Anderson, Corvallis, OR (US); Mitchell A. Abrams, Corvallis, OR (US); Michael A. Pate, Corvallis, OR (US); Andrew L. Van Brocklin, Corvallis, OR (US); Lawrence J. Gutkowski, San Diego, CA (US); Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 241 days.

(21) Appl. No.: 10/123,631

(22) Filed: Apr. 15, 2002

(65) Prior Publication Data

US 2003/0194214 A1 Oct. 16, 2003

(51) Int. Cl.
*B41J 2/47* (2006.01)
*G11B 27/36* (2006.01)

(52) U.S. Cl. .................. 347/225; 369/53.24

(58) Field of Classification Search ........ 347/224–225, 347/240, 251, 229; 369/53.1–53.44, 47.11, 369/44.38–44.39, 30.04, 47.31, 292, 30.23; 400/70; 101/37, 35
See application file for complete search history.

(56) References Cited

U.S. PATENT DOCUMENTS

| | | | | |
|---|---|---|---|---|
| 4,497,049 | A | * | 1/1985 | d'Alayer de Costemore d'Arc ..... 369/47.11 |
| 5,424,526 | A | | 6/1995 | Leonhardt et al. .......... 235/487 |
| 5,745,102 | A | | 4/1998 | Bloch et al. ................. 345/530 |
| 5,967,676 | A | * | 10/1999 | Cutler et al. .................. 400/70 |
| 6,041,703 | A | * | 3/2000 | Salisbury et al. ............. 101/37 |
| 6,182,565 | B1 | * | 2/2001 | Takayama et al. ............ 101/35 |
| 6,532,034 | B1 | * | 3/2003 | Hirotsune et al. .......... 347/229 |
| 6,778,205 | B1 | * | 8/2004 | Anderson et al. ........... 347/251 |
| 2001/0040867 | A1 | * | 11/2001 | Onodera et al. ............ 369/292 |
| 2003/0107959 | A1 | * | 6/2003 | Norton et al. ........... 369/30.23 |
| 2003/0108708 | A1 | * | 6/2003 | Anderson et al. .......... 428/64.4 |

FOREIGN PATENT DOCUMENTS

| | | |
|---|---|---|
| JP | 2002203321 | 7/2002 |
| WO | WO 01/28866 | 4/2001 |

OTHER PUBLICATIONS

LightScribe FAQ, www.lightscribe.com/faq.aspx, copyright 2004.
LightScribe Fact Sheet: What Is LightScribe Direct Disc Labeling?, www.lightscribe.com/newsroom.apx, Aug. 19, 2004.

* cited by examiner

*Primary Examiner*—Hai Pham

(57) ABSTRACT

Marking an optical disc based on information related to the data side thereof is disclosed. Information related to the data side of the optical disc is first determined. A marking based on the data side of the optical disc as has been read is then written with a laser to a label area on either the data side or the label side of the optical disc.

44 Claims, 9 Drawing Sheets

FIG 2A
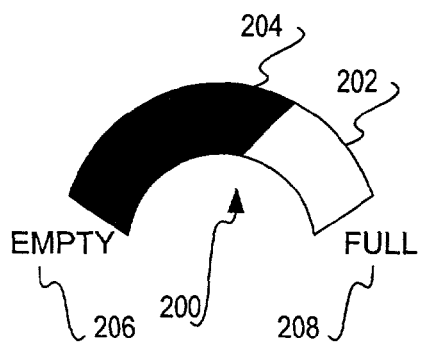
FIG 2B
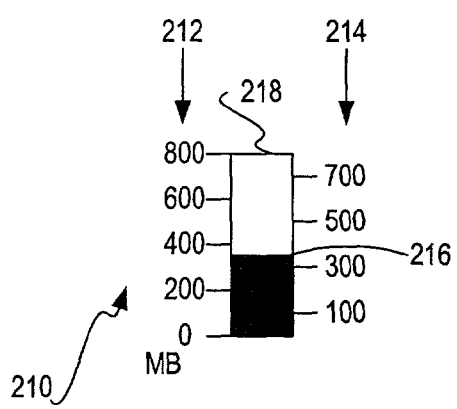
FIG 2C
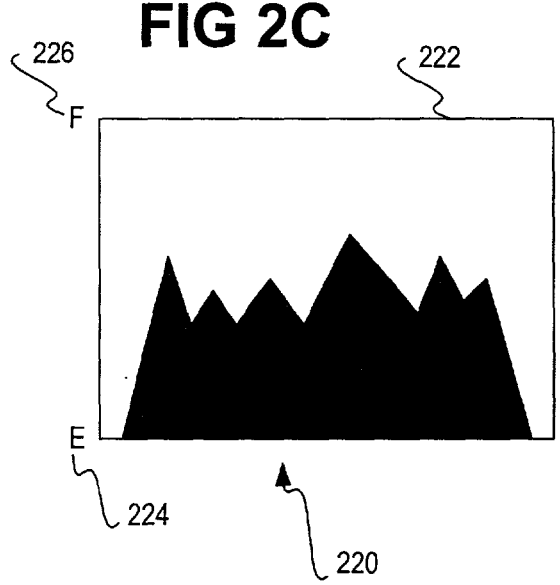
FIG 2D
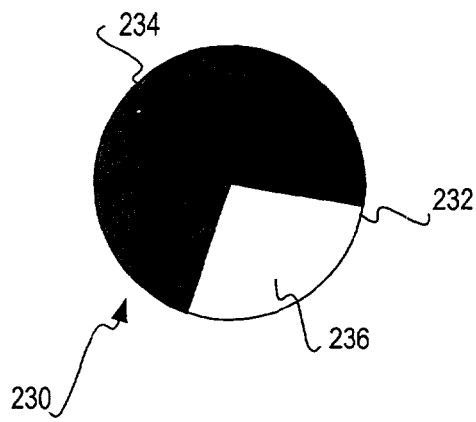
FIG 2E
242 { FREE SPACE: 348 OF 770 MB  
240
FIG 2F
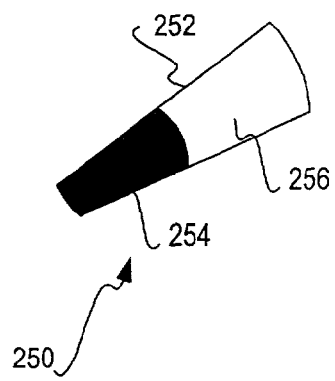
FIG 2G
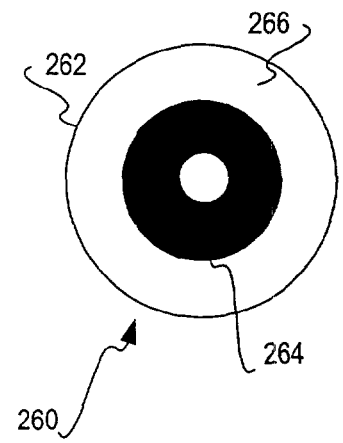

MARKING OPTICAL DISC BASED ON INFORMATION RELATED TO DATA SIDE THEREOF

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used. However, this is a laborious process: the labels must be carefully aligned on the discs, may in some instances damage the drive, and so on. Special-purpose printers that print directly on the discs can be used, but such printers are fairly expensive. In the patent application entitled "Integrated CD/DVD Recording and Label" filed on Oct. 11, 2001, and assigned Ser. No. 09/976,877, a solution to these difficulties is described, in which a laser is used to label optical discs.

However, many users have a large number of optical discs, and may find it difficult to keep up with what files are stored on which discs, and how much free space remains on a given disc. For example, a user may have a large number of discs including image files, perhaps taken with a digital camera, or a large number of discs including music files. To find a particular image file or a particular music file, typically the user has to either manually keep track of what files are stored on which discs, or repeatedly insert and remove discs into an optical disc drive until the disc storing the desired file is found. As another example, a user also has to typically insert an optical disc into an optical disc drive to learn the free space that remains on the disc. Both of these processes can be inconvenient and frustrating for the user.

SUMMARY OF THE INVENTION

A method of one embodiment of the invention determines information related to a data side of an optical disc. A marking based on this information as has been determined is then written with a laser to a label area on either the data side or the label side of the optical disc.

BRIEF DESCRIPTION OF THE DRAWINGS

FIGS. 2A–2G are diagrams of different representations of the space used or remaining on the data side of an optical disc, according to different embodiments of the invention.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Space Remaining or Space Used Representations

Figure 1A:
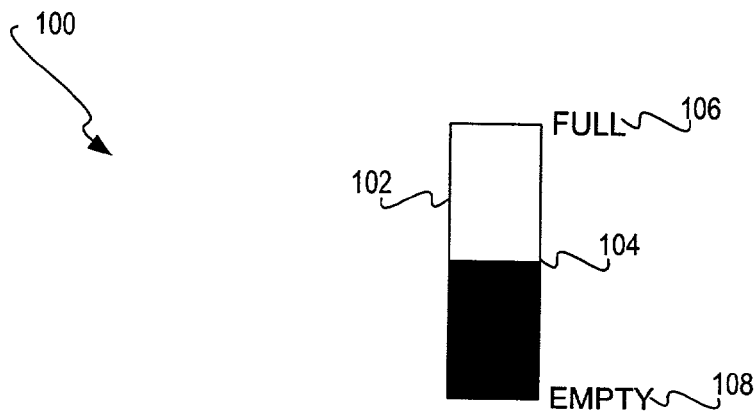
FIGS. 1A, 1B, and 1C are diagrams showing how a representation of the space used or remaining on the data side of an optical disc can be written to the label side or the data side of the optical disc as the space used or remaining changes, according to an embodiment of the invention.
Figure 1B:
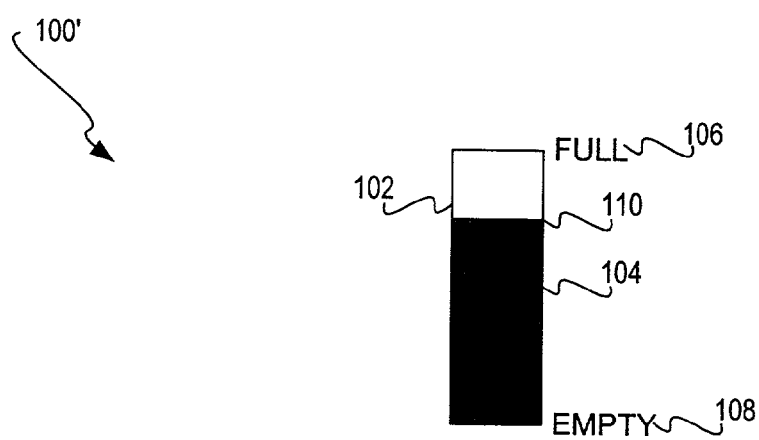
Figure 1C:
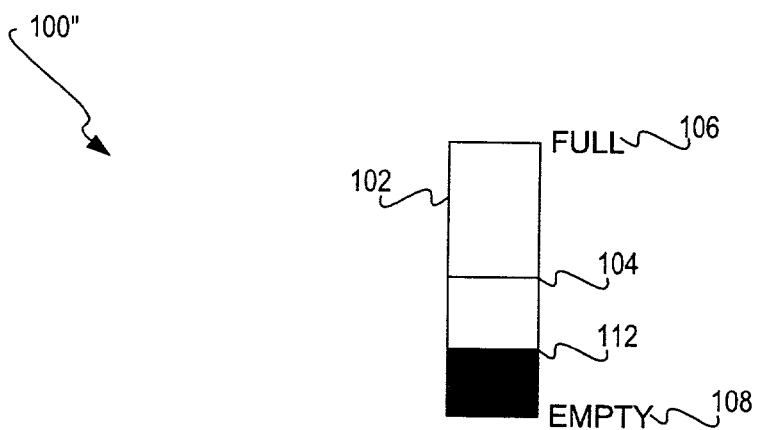

FIGS. 1A, 1B, and 1C show how one embodiment of the invention indicates on the label side or the data side of an optical disc the amount of space remaining and/or the amount of space used on the data side of the optical disc. In FIG. 1A, the representation 100 is written with a laser on a label area of either the data side or the label side of an optical disc. The representation 100 specifically includes a bar graph 102, indicating the amount of space taken up on the data side of the optical disc from an empty indicator 108 to a full indicator 106. As shown in FIG. 1A, the bar graph 102 has been shaded to the point 104. This means that the amount of space used on the optical disc on a percentage basis is the distance between the point 104 and the empty indicator 108, divided by the distance between the full indicator 106 and the empty indicator 108.

The optical disc on which the representation 100 is written with a laser can be a write-once media, such as a Compact Disc-Recordable (CD-R) optical disc, or a rewritable media, such as a Compact Disc-Rewritable (CD-RW) optical disc. The optical disc may also be a recordable or rewritable Digital Video/Versatile Disc (DVD), or another type of optical disc. The label side is the side of the optical disc on which marking or imaging can occur. In the context of CD-type optical media, it is typically opposite the data side, whereas in the context of DVD-type optical media, it may be opposite the data side, or included as part of the data side.

For either recordable or rewritable optical discs, the user can record additional data to the data side of the optical disc, such that more of the space is used on the optical disc. When this occurs, the representation 100 of FIG. 1A is updated as the representation 100' of FIG. 1B. The bar graph 102 has been shaded in FIG. 1B to a higher point 110 than the point 104, indicating that more space has been used on the optical disc.

The additional shading of the representation 100' of FIG. 1B can be accomplished in a number of different ways. The representation 100 of FIG. 1A can be incrementally added to, shading the area of the bar graph 102 between the point 104 and the point 110. The representation 100 of FIG. 1A may be completely erased, and the representation 100' of FIG. 1B written anew to the data side or the label side of the optical disc. The representation 100' of FIG. 1B may also be written anew to the optical disc without first erasing the representation 100 of FIG. 1A, such that the representation 100' of FIG. 1B overstrikes the representation 100 of FIG. 1A. That is, overstriking generally can mean changing, but not erasing, existing pixels already written to, or in the neighborhood of pixels already written to, so as to change the representation's meaning or look.

Where the optical disc is a rewritable media, such as a CD-RW optical disc, the user may erase or delete data that has already been written to the data side of the optical disc, such that less of the space is used. When this occurs, the representation 100 of FIG. 1A is updated as the representation 100" of FIG. 1C. The bar graph 102 is shaded in FIG. 1C to a lower point 112 than the point 104, indicating that less space has been used on the optical disc. The lesser shading of the representation 100" of FIG. 1C can also be accomplished in a number of different ways. The representation 100 of FIG. 1A may be erased between the points 104 and 112. Alternatively, the representation 100 of FIG. 1A may be completely erased, and the representation 100" of FIG. 1C written anew.

The bar graph representation of FIGS. 1A, 1B, and 1C is one manner by which an embodiment of the invention may represent on the data side or the label side of an optical disc the amount of space used or remaining on the data side of the disc. Other examples are shown in FIGS. 2A–2G. Each of the representations of FIGS. 2A–2G can be updated in the ways that have been described with respect to the representations of FIGS. 1A–1C. Furthermore, other types of representations of the amount of space used or remaining on the disc side of an optical disc can be used by embodiments of the invention. In addition, the entire representation may not be written with a laser. For instance, manufacturers may provide optical discs that have the outline of a given representation, corresponding to all the space on the optical disc being free. In this instance, what is then specifically written with a laser is the filling in of the representation, as the space on the optical disc is used.

In FIG. 2A, the representation 200 includes a curved bar graph 202, which is preferably curved concentric with the curve of the optical disc itself. The graph 202 is shaded to a point 204 between an empty indicator 206 and a full indicator 208 proportional to the amount of space used on the optical disc. In FIG. 2B, the representation 210 includes a graduated bar graph 218. The graduated bar graph 218 has graduated indicators 212 and 214 to its left and right, respectively, that permit a user to easily gauge the approximate amount of space used on the optical disc. For instance, the bar graph 218 is shaded to a point 216, between the 300 and 400 megabyte (MB) indicators, such that the amount of space used on the optical disc is between 300 and 400 MB. Furthermore, other types of indications of space can be used, besides just memory indicators like MB indicators. For instance, in the context of optical discs being used to store audio and/or video content, the indications may indicate the number of minutes that can still be recorded, or that have been recorded, on the optical disc.

In FIG. 2C, the representation 220 includes a histogram 220. Between the empty indicator 224 and the full indicator 226, the histogram 220 indicates the amount of space that has been used on the data side of the optical disc over time. In FIG. 2D, the representation 230 includes a pie chart 232. The shaded portion 234 and the unshaded portion 236 of the pie chart 232 indicate proportionally the amount of used space and free space, respectively, on the optical disc. In FIG. 2E, the representation 240 includes text 242 that indicates the amount of free space remaining on the optical disc. Alternatively, the text 242 could indicate the amount of space used on the optical disc.

In FIG. 2F, the representation 250 includes a slice 252 that preferably spans the label side of the optical disc from its inside border to its outside border. The slice 252 indicates by its shaded portion 254 the amount of space used on the data side of the optical disc, and by its unshaded portion 256 the amount of space remaining on the data side of the disc. Preferably, the shaded and unshaded portions 254 and 256 of the slice 252 mirror the degree to which the data side of the optical disc has been visibly modified as result of the data being stored thereon. In FIG. 2G, the representation 260 includes a small optical disc image 262. The optical disc image 262 indicates by its shaded portion 264 the amount of space used on the data side of the disc, and by its unshaded portion 266 the amount of space remaining. Preferably, the shaded and unshaded portions 264 and 266 mirror the degree to which the data side of the optical disc has been visibly modified as a result of the data stored thereon.

Figure 3:
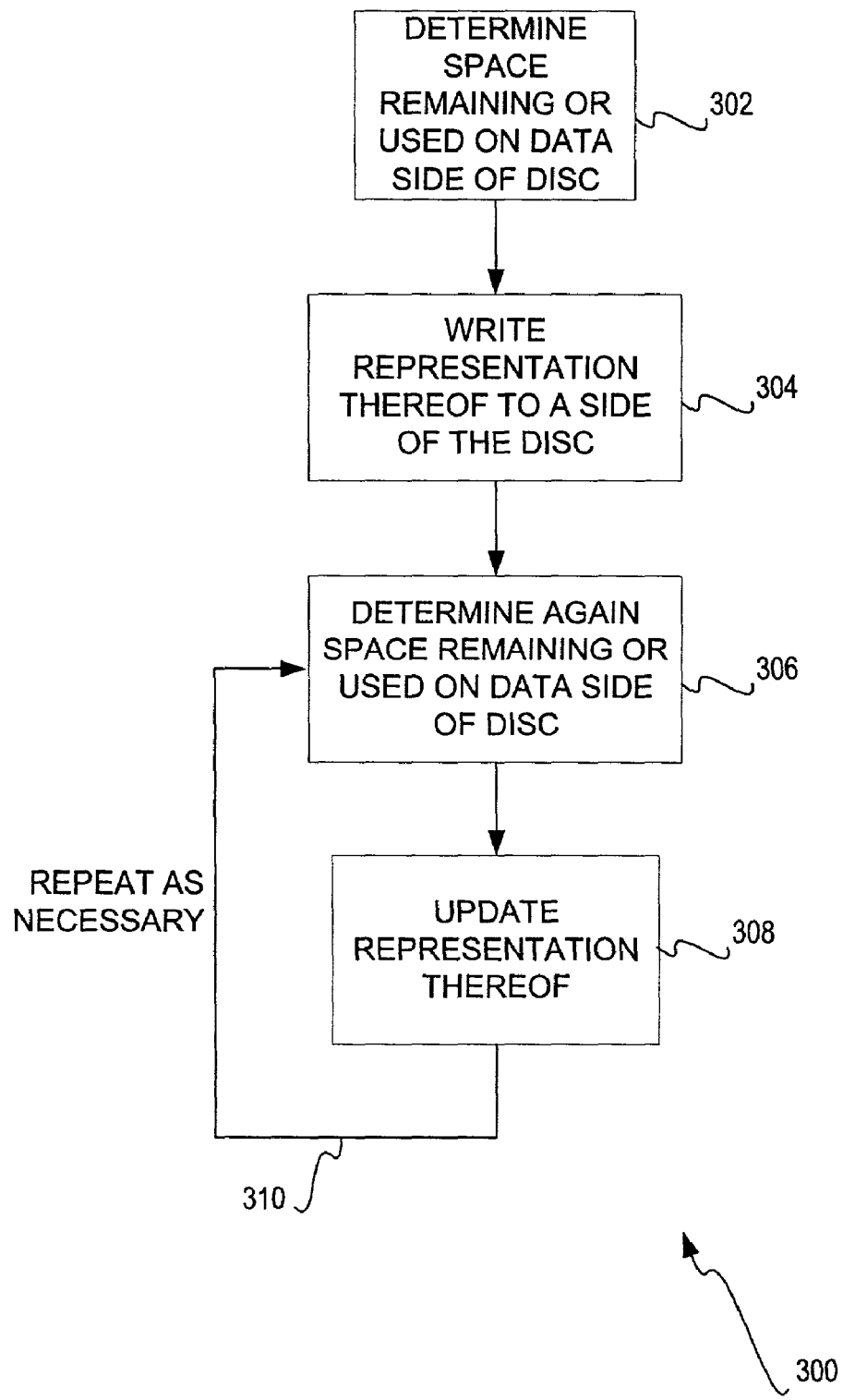
FIG. 3 is a flowchart of a method for writing a representation of the space used or remaining on the data side of an optical disc to the label side or the data side of the optical disc, according to an embodiment of the invention.

FIG. 3 shows a method 300 for writing a representation of the space used or remaining on the data side of an optical disc to either the data side or the label side of the optical disc, according to an embodiment of the invention. The method 300 can use employ of the representations of FIGS. 1A–1C and FIGS. 2A–2G that have been described, as well as other types of representations. The method 300 may be implemented as a computer program that can be saved on a computer-readable medium, such as a floppy disk or a CD-ROM.

First, the space remaining and/or the space used on the data side of the optical disc is determined (302). A representation of this space remaining and/or used is then written with a laser to either the data side or the label side of the optical disc (304). When additional space has been used or has been freed, or the user requests that the representation be updated, the method 300 determines again the amount of space remaining and/or used (306), and updates the representation thereof (308). Updating the representation of the space remaining and/or used can be accomplished as has been described in conjunction with FIGS. 1A–1C. Finally, the method 300 repeats 306 and 308 as necessary, as indicated by the line 310.

File Representations

Figure 4A:
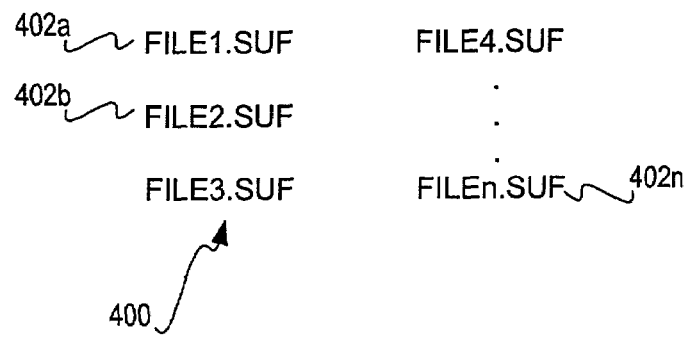
FIGS. 4A, 4B, and 4C are diagrams of different representations of a list of files stored on the data side of an optical disc, according to different embodiments of the invention.
Figure 4B:
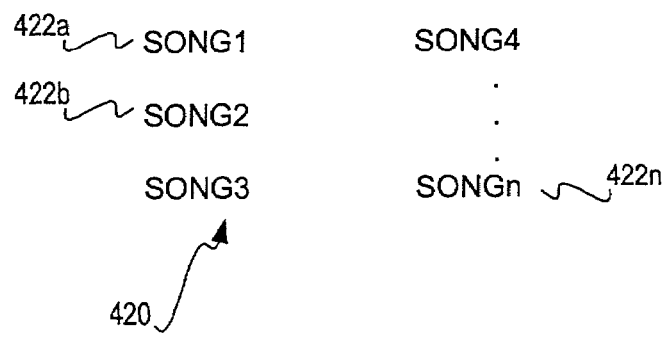
Figure 4C:
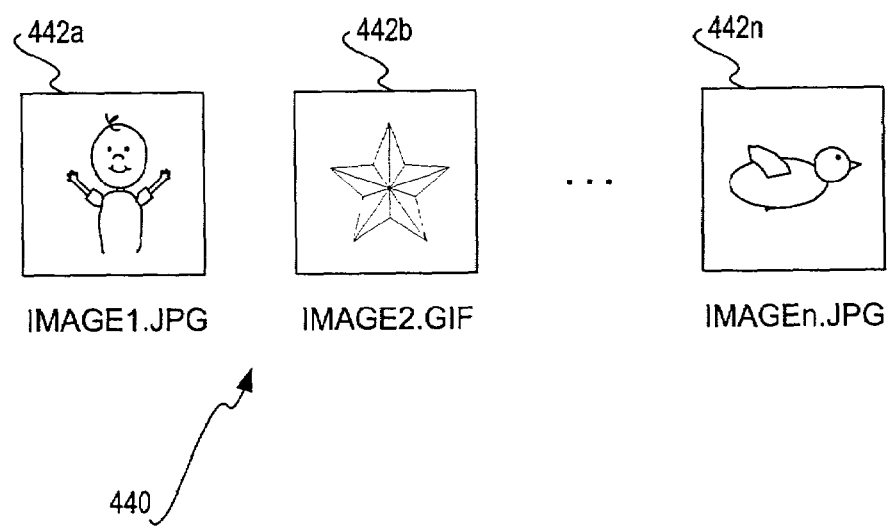

FIGS. 4A, 4B, and 4C show how different embodiments of the invention indicate on the label side or the data side of an optical disc representations of files stored on the data side of the optical disc. The representations can be updated as has been described in conjunction with FIGS. 1A–1C. That is, the representations can be added to when new files are stored on the data side of the disc, the representations can be completely erased and/or rewritten when new files are stored and/or existing files are erased, and/or the representations can be overstruck.

FIG. 4A shows a representation 400 of the files stored on the data side of an optical disc according to an embodiment of the invention. The representation 400 includes the names of a list of files currently stored on the data side of the optical disc. The list of files includes files 402a, 402b, . . . , 402n. Furthermore, not specifically shown in FIG. 4A is that a name that designates the entire list of files may also be written. FIG. 4B shows a representation 420 of the music files stored on the data side of an optical disc according to an embodiment of the invention. The representation 420 includes the song names represented by the list of files currently stored on the data side of the optical disc. The list of songs include songs 422a, 422b, . . . , 422n.

FIG. 4C shows a representation 440 of the image or video files stored on the data side of an optical disc according to an embodiment of the invention. Such image or video files are more generally graphics files. The representation 440 includes a thumbnail image of each image or video file of a list of image or video files currently stored on the data side of the optical disc, as well as optionally the name of each file. The list of images or videos includes images or videos 442a, 442b, . . . , 442n. Other representations of lists of files can also be used by embodiments of the invention, besides those indicated in FIGS. 4A–C. For instance, where the list of files relates to a backup set of data stored elsewhere, the date at which the backup was performed may be indicated, and so on. As another example, where the list of files includes music or audio files, the play times of each file may be listed. Alternatively, the size of each file may be listed, and so on.

Figure 5:
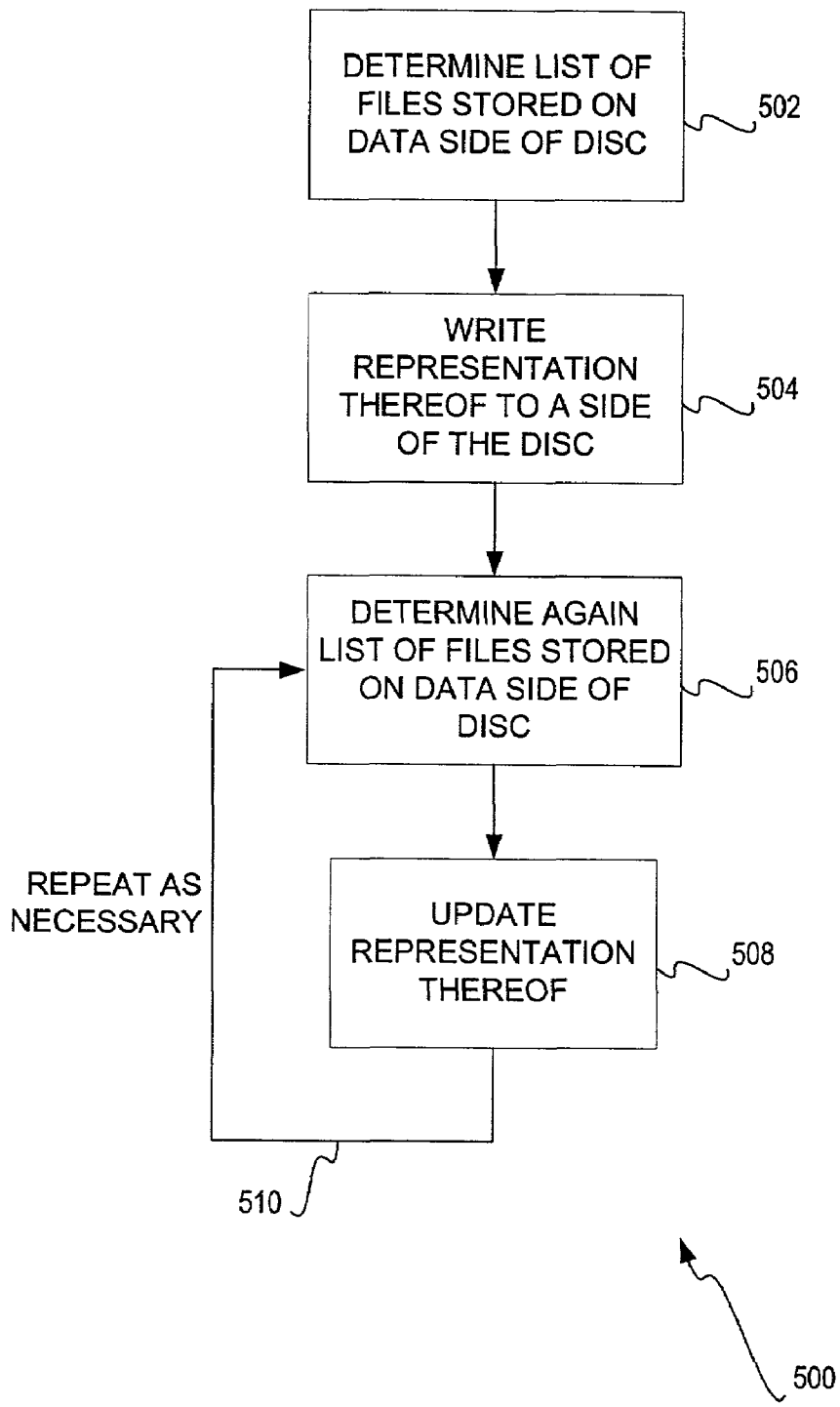
FIG. 5 is a flowchart of a method for writing a representation of a list of files stored on the data side of an optical disc to the label side or the data side of the optical disc, according to an embodiment of the invention.

FIG. 5 shows a method 500 for writing a representation of a list of files stored on the data side of an optical disc to either the data side or the label side of the optical disc, according to an embodiment of the invention. The method 500 can employ any of the representations of FIGS. 4A–4C that have been described, as well as other types of representations. The method 500 may be implemented as a computer program that can be saved on a computer-readable medium, such as a floppy disk or a CD-ROM, or an integrated circuit (IC), such as a firmware, flash memory, and so on.

First, the list of files stored on the data side of the optical disc is determined (502). The list of files may be all the files stored on the disc, only the music files stored on the disc, only the image files stored on the disc, and so on. A representation of this list of files is then written with a laser to either the data side or the label side of the optical disc (504). When new files have been added to the data side of the optical disc, when existing files have been deleted from the data side of the disc, or when the user requests to update the representation, the method 506 again determines the list of files (506), and updates the representation thereof. Updating the representation of the list of files can be accomplished as has been described in conjunction with FIGS. 1A–1C. Finally, the method 500 repeats 506 and 508 as necessary, as indicated by the line 510.

Implementation Method

Figure 6:
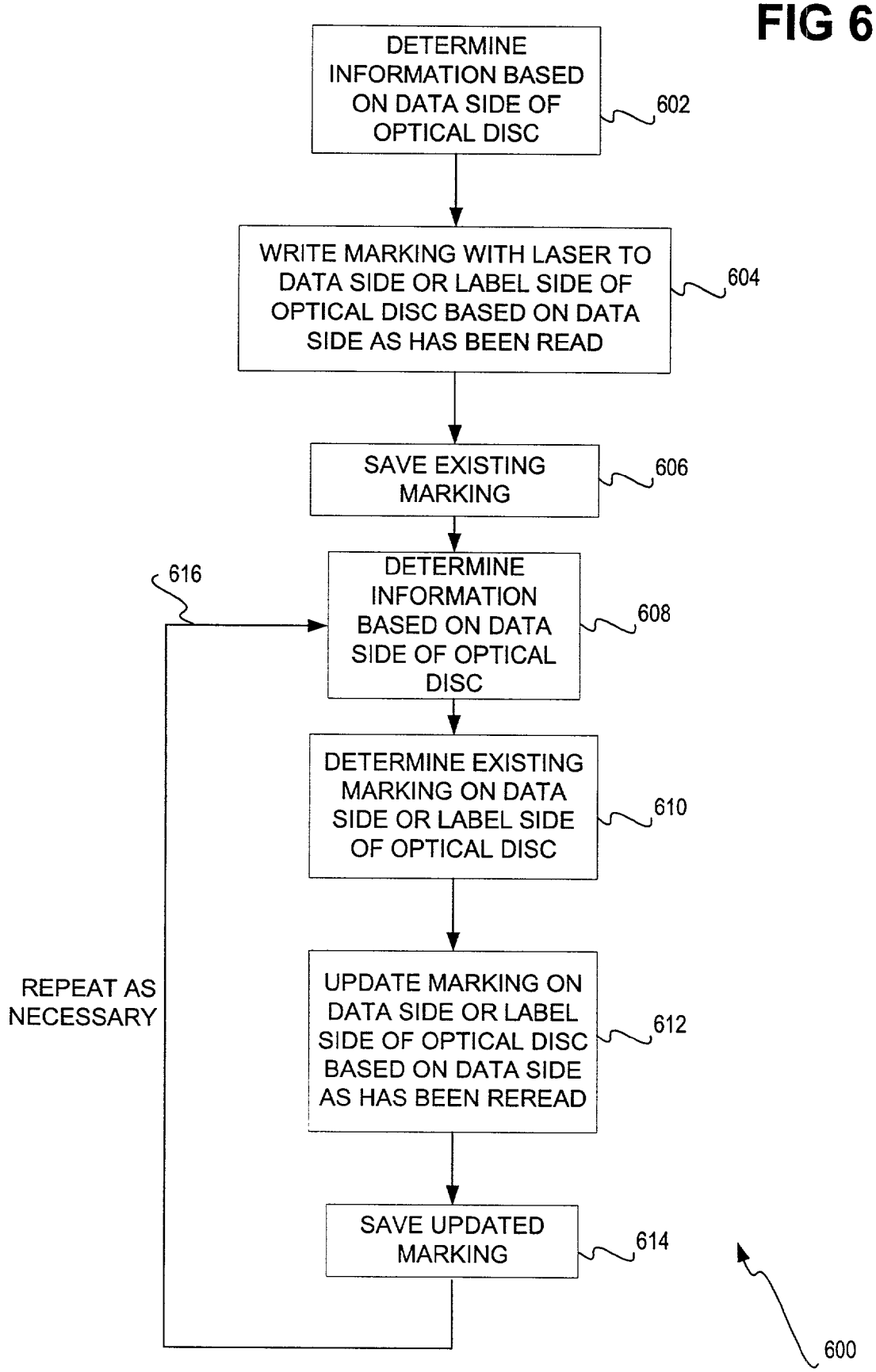
FIG. 6 is a flowchart of a method for implementing an embodiment of the invention, such as the method of FIG. 3, the method of FIG. 5, or a method of another embodiment of the invention.

FIG. 6 shows a method 600 for implementing an embodiment of the invention. The method 600 can be used to implement the method 300 of FIG. 3, the method 500 of FIG. 5, or another method of an embodiment of the invention. The method 600 may be implemented as a computer program that can be saved on a computer-readable medium, such as a floppy disk or a CD-ROM.

First, information related to the data side of an optical disc is determined (602). This can include determining the free space and/or the used space of the data side of the optical disc. It can also include determining the list of files that are or will be stored on the data side of the optical side. All the files stored on the data side may be determined, or only those of a particular type, such as only image files, music or audio files, and so on. Determining the related to the data side of the optical disc can specifically involve reading the data side of the optical disc, or referencing other sources of information related to the data side of the optical disc. For instance, information relating to the data side of the optical disc may be saved on another storage device, such as a hard disk drive. Or, the user may be queried to provide information relating to the data side of the optical disc. As another example, a user may arrange which files, such as music or other types of files, are to be recorded on the data side of the optical disc. Therefore, determining information related to the data side of the optical disc encompasses the scenario whether this information includes files that will be recorded to the data side of the optical disc.

A marking is then written with a laser to either the data side or the label side of the optical disc, based on the information related to the data side of the disc as has been determined (604). If the marking is to the label side of the disc, and there is only a single laser in the optical disc drive being used, then the user may be first instructed to flip over the optical disc in the drive. The method 600 may then wait for the user to flip over the disc prior to writing the marking with a laser. The marking may be based on the information in a number of different ways, several of which have been specifically described in preceding sections of the detailed description. More generally, the marking may be based on the information related to the data side as a whole, or may be based on individual pieces of this information. In the former instance, the marking may include a title of the disc that is based on the information related to the data side. In the latter instance, the marking may include the specific names of files stored on the data side, and so on.

For instance, where determining information related to the data side of the disc included determining the free space and/or the used space on the data side, writing the marking can include writing a representation of the free space and/or the used space. This representation may be a bar graph, a histogram, a pie chart, text, an optical disc representation, or another type of representation. Where determining information related to the data side of the disc included determining a list of files stored on the data side, writing the marking can include writing a representation of or the name of each of the files, writing the name of each of the songs represented by the files, writing a thumbnail of each of the images represented by the files, and so on.

The marking that is written may be a human-readable marking written to the data side or the label side of the optical disc, and/or a machine-readable marking written to the label side of the optical disc. A human-readable marking is one that a human can understand by viewing the marking, such as the representations of FIGS. 1A–1C, 2A–2G, and 4A–4C. A machine-readable marking is one that a machine, such as a computer, can understand by scanning the marking. Such a machine-readable marking may be a bar code or another type of indicia. A machine-readable marking may be desired to be written to the label side of the disc, for example, so that the computer or other machine can determine the space used or remaining on the data side or the files stored on the data side without the user having to flip the optical disc over, where the optical disc drive has only a single laser.

Furthermore, a human-readable marking may also be a machine-readable marking in that a computer or other type of machine may be able to discern what is indicated by the human-readable marking by scanning the marking and recognizing it. By comparison, a machine-readable marking may be only machine-readable, and not human-readable, if it is a bar code or other type of indicia not readily understandable by a human by viewing the marking. Thus, the marking that is written may be human-readable and potentially also machine-readable, or only machine-readable.

The markings that are written may also be of types other than that which have been described in the previous sections of the detailed description. For instance, security- and/or encryption-related markings that are machine-readable but not human-readable can be written. Such markings may provide information regarding how the data on the data side of an optical disc can be accessed. The markings may also provide a decryption key for the data on the data side of the optical disc, such that if the data is copied, it is not usable without this key. Such types of markings may be substantially invisible to users inspecting the optical disc. The markings may also include dot matrix codes, bar codes, and other types of marking that encode information in a typically human-unreadable manner.

The method 600 next preferably saves the existing marking that has been written (606). Saving the existing marking allows for more easily accomplished subsequent updating of the marking. Once the marking is created, for instance, a data file of the marking may be saved to the data side of the optical disc, or to another type of storage, such as the internal hard disk drive of the computer. This saving may be accomplished before or after the marking has been written in 604. Alternatively, rather than a data file of the marking saved to the data side of the optical disc, an indicia, such as a bar code, representing the marking may be saved to either the data side or the label side of the optical disc. Alternatively still, the marking may not be saved at all.

If the list of files or the space used or remaining on the data side of the optical disc changes, or if the user requests that the marking be updated, then the information related to data side of the optical disc can again be determined (608), and the existing marking on the data side or the label side of the optical disc is determined (610). Determining the existing marking may include reading the data file of the marking that was previously saved, reading an indicia representing the marking that was previously written, or scanning in or reading the marking itself. Such determination is based on whether marking was saved in 606, and how the marking was saved in 606.

The marking is then updated based on the information related to the data side of the optical disc as has been again determined (612). As has been particularly described in conjunction with FIGS. 1A–1C, updating the marking can be accomplished in a number of different ways. The marking can be added to without erasing the marking as previously written and without overstriking the marking as previously written. The marking may be completely erased and written anew. The marking may also be overstruck or appended to update it.

The updated marking is then optionally saved (614), preferably in the same manner as was achieved in 606. The user may be requested to flip over the optical disc in order to save the updated marking to the appropriate side of the optical disc, if there is only a single laser in the optical disc drive, and if this laser is not currently incident to the side on which the updated marking is to be saved. Furthermore, the updating marking may be saved either prior to or after the method 600 performs 612. Finally, the method 600 repeats 608, 610, 612, and 614 as necessary, as indicated by the line 616, when the list of files or the amount of space remaining or used on the data side of the optical disc again changes, or when the user requests to update the marking.

System

Figure 7:
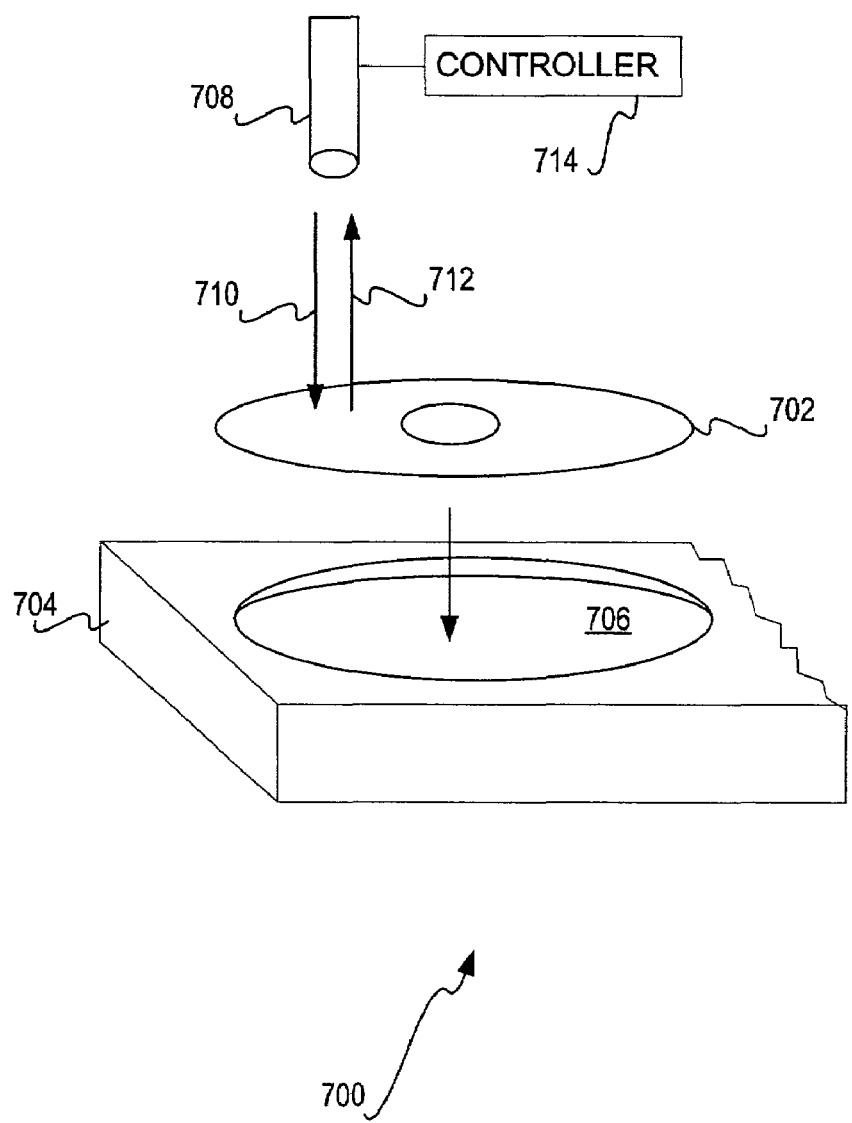
FIG. 7 is a diagram of a system according to an embodiment of the invention.

FIG. 7 shows a system 700 according to an embodiment of the invention. The methods that have been described can be implemented in conjunction with the system 700. The system 700 includes a mechanism 704 having a seat 706 in which the optical disc 702 can rotatably rest. The mechanism 704 is generally receptive to the optical disc 702, and may include motors and other components not shown in FIG. 7. The mechanism 704 is depicted in FIG. 7 as a tray, but may also be such that the optical disc 702 is fed or inserted directly thereinto, instead of being placed on a tray.

The system 700 also includes a laser 708. The laser 708 emits signals 710 and senses signals 712 reflected by the optical disc 702 as the disc 702 rotates in the mechanism 704. As such, the laser 708 and/or the system 700 may include a sensor to sense or detect the signals 712 reflected by the optical disc 702. The laser 708 thus is for reading information from and/or writing information to the optical disc 702, such as the label side and/or the data side of the optical disc 702.

The system 700 also includes a controller 714. The controller 714 may be software, hardware, or a combination of software and hardware. The controller 714 controls the laser 708. The controller 714 can at least direct the laser 708 to write to the optical disc 702, such as to write the markings on the optical disc 702 that have been described.

Figure 8:
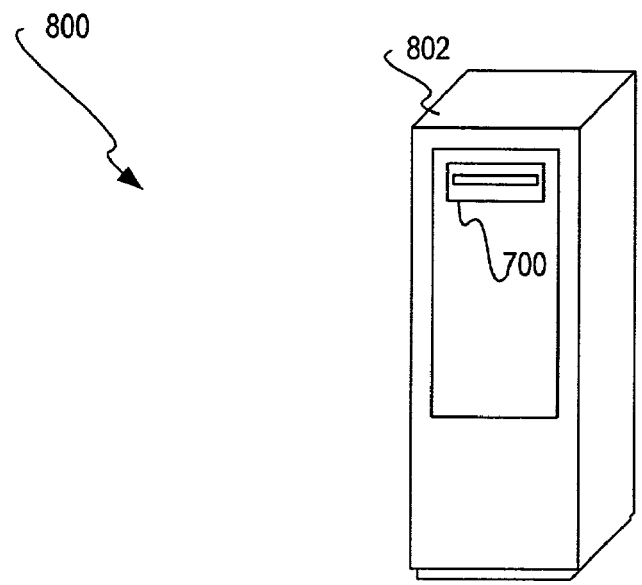
FIG. 8 is a diagram showing how an embodiment of the invention can be internally adapted to a computer.
Figure 9:
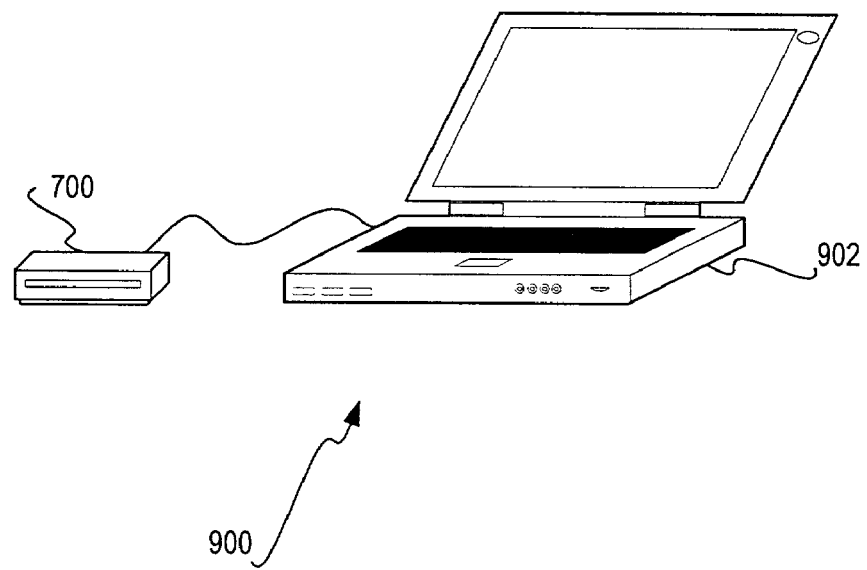
FIG. 9 is a diagram showing how an embodiment of the invention can be externally adapted to a computer.

The system 700 may be part of a computer, such as a desktop or laptop computer. The system 700 may also be encased in an enclosure internally or externally connectable to a computer. FIG. 8 shows a system 800 according to an embodiment of the invention that includes a desktop tower computer 802 in which the system 700 is encased in an enclosure that has been internally connected to the computer 802. By comparison, FIG. 9 shows a system 900 according to an embodiment of the invention that includes a laptop computer 902 in which the system 700 is enclosed in an enclosure that has been externally connected to the computer 902. Whereas the computer 902 is depicted in FIG. 9 as a laptop computer, it may also be a desktop computer, or another type of computer.

Computer Program

Figure 10:
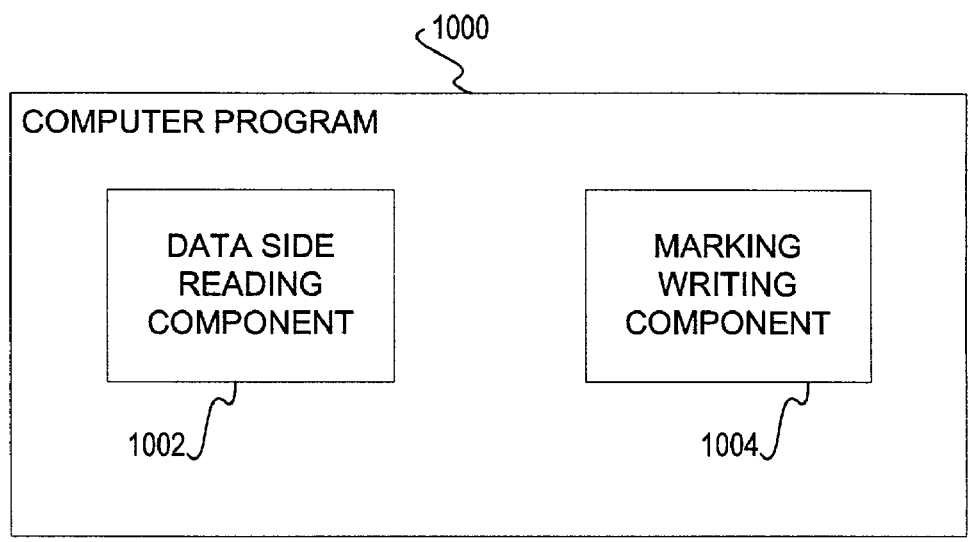
FIG. 10 is a diagram of a computer program according to an embodiment of the invention.

FIG. 10 shows a computer program 1000 according to an embodiment of the invention. The methods that have been described can be implemented in conjunction with the computer program 1000. Furthermore, the computer program 1000 may be used to control the system 700 of FIG. 7, where the program 1000 may reside within the controller 714 of FIG. 7. The computer program 1000 may also be stored on a computer-readable medium, such as a floppy disk or a CD-ROM.

The computer program 1000 is depicted in FIG. 10 as including two components 1002 and 1004. Each of these components may be implemented as a separate set of computer-executable instructions, module, set of routines, and so on. However, the components are discretely shown in FIG. 10 for illustrative clarity. Therefore, their individual functionality may be combined into one or more other components, or distributed among a different set of components as well. Each component may also be considered the means for performing its respective functionality.

The data side reading component 1002 is specifically for reading the data side of an optical disc inserted into an optical media storage device with a laser. The storage device may be the system 900, for instance. The marking writing component 1004 is specifically for writing a marking based on the data side of the optical disc as has been read to the label side or the data side of the optical disc within the optical media storage device. The marking may be that which has been previously described in the detailed description.

Removable Data Storage Media Device

Embodiments of the invention have been substantially described herein in relation to writing a marking on a label side or a data side of an optical disc inserted into an optical disc drive. However, in accordance with another embodiment of the invention shown in FIG. 11, a marking may be written to a label area of other types of removable data storage media as well. The label area of a removable data storage medium is described as the region on which a descriptive label may be placed and/or the region on which a user may otherwise write on with a marker or other writing implement. For example, in the case of an optical disc, there is typically a label side that is considered the label area. For a floppy disk, the plastic outside casing is the label area. Similarly, for storage tapes, the plastic outside casing is the label area.

Figure 11:
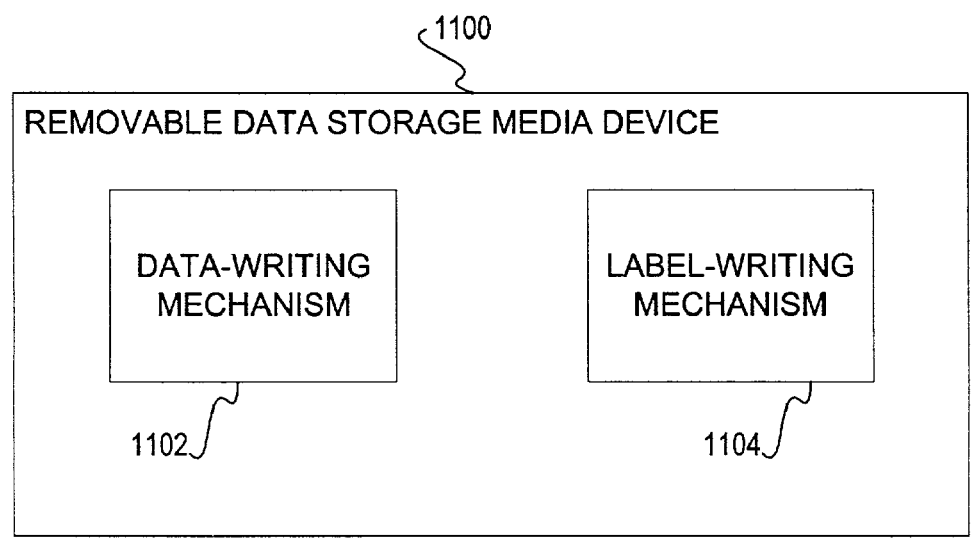
FIG. 11 is a block diagram of a removable data storage media device according to an embodiment of the invention and/or in conjunction with which an embodiment of the invention can be implemented.

FIG. 11 shows a block diagram of a removable data storage media device 1100, according to an embodiment of the invention. The device 1100 includes a data-writing mechanism 1102, and a label-writing mechanism 1104. There may be other components and/or parts of the device 1100 not depicted in FIG. 11, and the mechanisms 1102 and 1104 may perform other functionalities than those described herein. The data-writing mechanism 1102 is for writing data to a removable data storage medium, whereas the label-writing mechanism 1104 is for writing a marking based on the data written to the removable data storage medium to a label area of the medium.

As has been indicated, the removable data storage medium may be an optical disc, a floppy disk, a tape, or another type of medium. Such other types of media may include a removable hard disk drive, other types of magnetic media, other types of optical media, opto-magnetic media, as well as solid-state media, for example. The data-writing mechanism 1102 may be a laser in the case of optical media, or an electromagnet or other type of data-writing mechanism in the case of magnetic media. The label-writing mechanism 1104 is preferably a laser, and may be the same mechanism as the data-writing mechanism 1102. That is, a single writing mechanism may act as both the data-writing mechanism 1102 and the label-writing mechanism 1104, as may be the case with an optical media device.

Furthermore, the mechanisms 1102 and 1104 may be encased in an enclosure internally connectable to a computer, as has been described in conjunction with FIG. 8. The mechanisms 1102 and 1104 may also be encased in an enclosure externally connectable to a computer, as has been described in conjunction with FIG. 9. The mechanisms 1102 and 1104 may be encased in an enclosure that is considered a part of a computer as well.

Conclusion

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A method comprising:
   determining information related to a data side of an optical disc;
   writing with a laser a marking based on the information on the data side of the optical disc to a label side of the optical disc opposite the data side of the optical disc, the laser incident to the label side of the optical disc; and,
   at least one of:
   saving a data file of the marking on the data side of the optical disc; or,
   saving an indicia representing the marking on the label side of the optical disc.

2. The method of claim 1, farther comprising:
   determining again the information related to the data side of the optical disc; and,
   updating the marking based on the information on the data side of the optical disc as has been determined to the label side.

3. The method of claim 2, wherein updating the marking comprises adding to the marking without erasing the marking and without overstriking the marking as initially written.

4. The method of claim 2, wherein updating the marking comprises:
   erasing the marking as initially written; and,
   writing the marking as updated with the laser.

5. The method of claim 2, wherein updating the marking comprises overstriking the marking as initially written.

6. The method of claim 2, further comprising, after determining again the information related to the data side of the optical disc, reading a data file regarding the marking and recorded on the data side of the optical disc.

7. The method of claim 2, further comprising, after determining again the information related to the data side of the optical disc, reading an indicia representing the marking on the label side.

8. The method of claim 2, further comprising, after determining again the information related to the data side of the optical disc, reading the marking on the label side.

9. The method of claim 1, wherein determining the information related to the data side of the optical disc comprises determining at least one of a free space amount remaining and a used space amount taken on the data side of the optical disc.

10. The method of claim 9, wherein writing the marking comprises writing a representation of the at least one of the free space amount remaining and the used space amount taken on the data side of the optical disc.

11. The method of claim 10, wherein writing the representation comprises writing one of: a bar graph, a histogram, a pie chart, text, and an optical disc representation.

12. The method of claim 1, wherein determining the information related to the data side of the optical disc comprises determining a list of files written on the data side of the optical disc.

13. The method of claim 12, wherein writing the marking comprises writing a name of each of the list of files.

14. The method of claim 1, wherein determining the information related to the data side of the optical disc comprises determining a list of files of a particular type written on the data side of the optical disc.

15. The method of claim 14, wherein writing the marking comprises writing a name of each of the list of files.

16. The method of claim 14, wherein writing the marking comprises writing a name of designating the list of files.

17. The method of claim 14, wherein writing the marking comprises writing a name of each of a list of songs to which the list of files corresponds, where the particular type of the list of files is an audio file.

18. The method of claim 14, wherein writing the marking comprises writing a name designating a list of songs to which the list of files corresponds, where the particular type of the list of files is an audio file.

19. The method of claim 1, wherein determining the information related to the data side of the optical disc comprises reading a list of files of a particular type written on the data side of the optical disc.

20. The method of claim 19, wherein writing the marking comprises writing a representation of each of the list of files.

21. The method of claim 20, wherein writing the representation of each of the list of files comprises writing a thumbnail image of each of the list of files.

22. The method of claim 21, wherein each of the list of files is at least one of an image file and a video file.

23. The method of claim 1, wherein writing the marking comprises writing a human-readable marking to the label side of the optical disc.

24. The method of claim 1, wherein writing the marking comprises writing a machine-readable marking to the label side of the optical disc.

25. The method of claim 24, wherein writing the machine-readable marking to the label side of the optical disc comprises writing at least one of: a security-related marking, an encryption-related marking, and an information-encoded marking.

26. A computer-readable medium having a computer program stored thereon to perform a method comprising:
    determining at least one of a free space amount remaining and a used space amount taken on a data side of an optical disc;
    writing a representation of the at least one of the free space amount remaining and the used space amount taken on the data side of the optical disc to a label side of the optical disc;
    determining the at least one of the free space amount remaining and the used space amount taken on the data side of the optical disc; and,
    updating the representation of the at least one of the free space amount remaining and the used space amount taken on the data side of the optical disc to the label side of the optical disc.

27. The medium of claim 26, where writing the representation comprises writing at least one of: a bar graph, a histogram, a pie chart, text, and an optical disc representation.

28. A computer-readable medium having a computer program stored thereon to perform a method comprising:
    determining a list of files written on the data side of the optical disc;
    writing a representation of each of the list of files to a label side of the optical disc opposite the data side of the optical disc with a laser incident to the label side of the optical disc; and,
    at least one of:
        saving a data file of the representation on the data side of the optical disc; or,
        saving an indicia representing the representation on the label side of the optical disc.

29. The medium of claim 28, wherein writing the representation of each of the list of files comprises writing a file name of each of the list of files.

30. The medium of claim 28, wherein determining the list of files comprises determining the list of files of a particular type.

31. The medium of claim 28, wherein determining the list of files comprises determining a list of song files, and writing a representation of each of the list of files comprises writing a song name of each of the list of song files.

32. The medium of claim 28, wherein determining the list of files comprises determining a list of at least one of image and video files, and writing a representation of each of the list of files comprises writing a thumbnail image of each of the list.

33. A computer-readable medium having a computer program stored thereon comprising:
    means for causing a laser of an optical media storage device to read a data side of an optical disc inserted into the optical media storage device;
    means for causing the laser of the optical media storage device to write a marking based on the data side of the optical disc as has been read to a label side of the optical disc within the optical media storage device, the laser being incident to the label side of the optical disc, the label side of the optical disc opposite the data side of the optical disc; and,
    at least one of:
        means for saving a data file of the marking on the data side of the optical disc; or,
        means for saving an indicia representing the marking on the label side of the optical disc.

34. A removable data storage media device comprising:
    a data-writing mechanism to write data to a data side of a removable data storage medium;
    a label-writing mechanism to write a marking with a laser based on the data written to the removable data storage medium to a label side of the removable data storage medium opposite the data side, the laser incident to the label side of the removable data storage medium; and,
    at least one of:
        a mechanism to save a data file of the marking on the data side of the optical disc; or,
        a mechanism to save an indicia representing the marking on the label side of the optical disc.

35. The device of claim 34, wherein the label-writing mechanism comprises the laser.

36. The device of claim 34, wherein a single writing mechanism acts as both the data-writing mechanism and the label-writing mechanism.

37. The device of claim 34, wherein the data-writing mechanism and the label-writing mechanism are encased in an enclosure internally connectable to a computer.

38. The device of claim 34, wherein the data-writing mechanism and the label-writing mechanism are encased in an enclosure externally connectable to a computer.

39. The device of claim 34, wherein the data-writing mechanism and the label-writing mechanism are part of a computer.

40. An optical disc comprising:
    a data side having information stored thereon; and,
    a label side opposite the data side on which a marking is written with a laser incident to the label side based on the information stored on the data side of the optical disc,
    wherein a data file of the marking has been saved on the data side of the optical disc.

41. The optical disc of claim 40, wherein the marking comprises a representation of at least one of a free space amount remaining and a used space amount taken on the data side of the optical disc.

42. The optical disc of claim 40, wherein the marking comprises a name of each of one or more of a list of files stored on the data side of the optical disc.

43. The optical disc of claim 40, wherein the marking comprises a representation of each of one or more of a list of files stored on the data side of the optical disc.

44. The optical disc of claim 40, wherein the marking comprises at least one of: a security-related marking, an encryption-related marking, and an information-encoded marking.

* * * * *

UNITED STATES PATENT AND TRADEMARK OFFICE
CERTIFICATE OF CORRECTION

| | | |
|---|---|---|
| PATENT NO. | : 7,145,586 B2 | Page 1 of 1 |
| APPLICATION NO. | : 10/123631 | |
| DATED | : December 5, 2006 | |
| INVENTOR(S) | : Daryl Anderson et al. | |

It is certified that error appears in the above-identified patent and that said Letters Patent is hereby corrected as shown below:

In column 5, line 35, delete "4A-C" and insert -- 4A-4C --, therefor.

In column 10, line 32, in Claim 2, delete "farther" and insert -- further --, therefor.

Signed and Sealed this

Eighteenth Day of August, 2009

David J. Kappos
*Director of the United States Patent and Trademark Office*